US008661972B2

(12) United States Patent
Czwaluk et al.

(10) Patent No.: US 8,661,972 B2

(45) Date of Patent: *Mar. 4, 2014

(54) SCREW SEPARATOR

(75) Inventors: Andreas Czwaluk, Vechta (DE); Matthias Rabener, Oelde (DE)

(73) Assignee: UTS Biogastechnik GmbH, Hallbergmoos (DE)

( * ) Notice: Subject to any disclaimer, the term of this patent is extended or adjusted under 35 U.S.C. 154(b) by 472 days.

This patent is subject to a terminal disclaimer.

(21) Appl. No.: 12/704,113

(22) Filed: Feb. 11, 2010

(65) Prior Publication Data

US 2011/0186500 A1 Aug. 4, 2011

(30) Foreign Application Priority Data

Feb. 2, 2010 (DE) ..................... 20 2010 001 765 U

(51) Int. Cl.

| | |
|---|---|
| ***B30B 9/00*** | (2006.01) |
| *B01D 21/02* | (2006.01) |
| *B01D 21/18* | (2006.01) |
| *B01D 25/32* | (2006.01) |
| *B01D 33/58* | (2006.01) |
| *B01D 35/00* | (2006.01) |
| *B01D 24/00* | (2006.01) |
| *B01D 25/00* | (2006.01) |
| *B01D 27/00* | (2006.01) |
| *B01D 29/00* | (2006.01) |
| *B01D 33/00* | (2006.01) |
| *B01D 35/16* | (2006.01) |
| *B01D 35/22* | (2006.01) |
| *B01D 35/30* | (2006.01) |

(52) U.S. Cl.

USPC ........... 100/117; 210/415; 210/335; 210/232; 210/236

(58) Field of Classification Search

USPC .................................. 210/413, 415; 100/117

See application file for complete search history.

(56) References Cited

U.S. PATENT DOCUMENTS

| | | | | |
|---|---|---|---|---|
| 631,072 A | | 8/1899 | Grosse | |
| 647,354 A | | 4/1900 | Anderson | |
| 2,215,944 A | | 4/1947 | Vincent | |
| 2,471,363 A | | 5/1949 | Vincent et al. | |
| 2,536,240 A | | 1/1951 | Vincent | |
| 3,003,412 A | | 10/1961 | Vincent | |
| 3,235,087 A | | 2/1966 | Andrews et al. | |
| 3,585,924 A | | 6/1971 | Nolan | |
| 3,672,641 A | * | 6/1972 | Slaby | 425/73 |
| 3,938,434 A | | 2/1976 | Cox | |
| 4,018,899 A | | 4/1977 | Seckler et al. | |
| 4,132,845 A | | 1/1979 | Covington, Jr. et al. | |
| 4,200,537 A | | 4/1980 | Lamort | |
| 4,214,377 A | | 7/1980 | Maffet | |
| 4,228,005 A | | 10/1980 | Covington, Jr. et al. | |
| 4,260,488 A | | 4/1981 | Condolios | |
| 4,291,619 A | * | 9/1981 | Hunt et al. | 100/43 |

(Continued)

*Primary Examiner* — Nam Nguyen

*Assistant Examiner* — Clare Perrin

(74) *Attorney, Agent, or Firm* — Greer, Burns & Crain, Ltd.

(57) ABSTRACT

A screw separator for separating solids out of suspensions, includes at least one housing and at least one feed pipe for the suspension, at least one discharge pipe for liquids, and at least one outlet for the at least partially dewatered solids wherein at least one strainer basket is provided in the housing in which a screw is rotatably mounted, and that the worm shaft of the screw terminates inside the housing and is continued by way of a separate pipe-like structure.

23 Claims, 4 Drawing Sheets

(56) References Cited

U.S. PATENT DOCUMENTS

| | | | | | |
|---|---|---|---|---|---|
| 4,309,291 | A | | 1/1982 | Probstein et al. | |
| 4,347,134 | A | | 8/1982 | Svehaug | |
| 4,358,371 | A | | 11/1982 | Jameson et al. | |
| 4,520,724 | A | | 6/1985 | Costarelli | |
| 4,818,403 | A | | 4/1989 | Nagaoka | |
| 4,915,830 | A | | 4/1990 | Mackay et al. | |
| 4,941,404 | A | * | 7/1990 | Tegtmeyer | 100/117 |
| 4,997,578 | A | | 3/1991 | Berggren | |
| 5,009,795 | A | * | 4/1991 | Eichler | 210/744 |
| 5,118,427 | A | * | 6/1992 | Eichler | 210/748.01 |
| 5,526,740 | A | | 6/1996 | Lee | |
| 5,665,232 | A | | 9/1997 | Schlegel | |
| 5,697,702 | A | | 12/1997 | Triassi et al. | |
| 5,833,851 | A | * | 11/1998 | Adams et al. | 210/413 |
| 6,550,376 | B2 | | 4/2003 | Johnston | |
| 8,151,702 | B2 | * | 4/2012 | Marchesini | 100/117 |
| 2001/0030107 | A1 | * | 10/2001 | Simpson | 198/670 |
| 2003/0015465 | A1 | * | 1/2003 | Fick et al. | 210/234 |
| 2006/0138054 | A1 | | 6/2006 | Menke et al. | |
| 2009/0211467 | A1 | | 8/2009 | Flor | |

* cited by examiner

SCREW SEPARATOR

BACKGROUND

The present invention relates to a screw separator for separating solids out of suspensions, the screw separator comprising a housing and a suspension feed pipe, and a discharge for the separated liquids, and an outlet for the dewatered solids. The housing is provided with a strainer basket in which a screw is rotatably arranged.

These screw separators have become known from the prior art. For example EP 0 367 037 B1 discloses a screw separator in which the worm shaft is rotatingly mounted throughout the strainer basket and protrudes outwardly via the mouthpiece of the screw separator. The fact that the worm shaft extends outwardly through the mouth beyond the end of the strainer basket ensures that the slug forming by the action of the screw will retain its hollow cylindrical shape and will not collapse as the screw ends. As a rule a collapsing slug would provide a useless result since slug formation is a key prerequisite for this separation of solids out of the suspension.

The known screw separator is reliable in operation. One drawback is that the worm shaft rotating inside the slug is subjected to excessive abrasion due to the high relative speed between the substantially non-rotating slug and the worm shaft. The slug formed of solids tends to comprise abrasive substances resulting in a reduced service life of the screw.

It is therefore the object of the present invention over the described prior art to provide a screw separator which comprises reliability of function and increased durability.

SUMMARY

The screw separator according to the invention serves for separating solids out of suspensions. The screw separator comprises at least one housing having at least one feed pipe for the suspension and at least one discharge for the separated liquid, and at least one outlet for the at least partially dewatered solids. The housing is provided with at least one strainer basket in which a screw is rotatably arranged. The worm shaft of the screw terminates within the housing, being continued by way of a separate pipe-like structure.

The screw separator of the invention has many advantages. A considerable advantage of the screw separator according to the invention is that the worm shaft does not pass through the outlet but terminates within the housing. To prevent the slug formed in the housing from collapsing, the worm shaft is continued according to the invention by way of a separate pipe-like structure supporting the slug internally. Thus the in particular approximately hollow cylindrical structure of the slug is efficiently maintained while at the same time wear on the worm shaft will be minimized. The separate pipe-like structure may be configured to be hollow or else formed solid. The pipe-like structure may be formed as a cylindrical rod or else comprise tapering or widening axial sections. A cone section shape is conceivable as well. The pipe-like structure may consist of a first material, being filled with other materials.

Due to the fact that the worm shaft terminates within the housing, continuing by way of a separate pipe-like structure, the rotational movement of the screw may be disconnected from a possible rotational movement of the pipe-like structure. This allows a very wear-resistant structure.

A conventional screw separator has a worm shaft for example between about 7 and 15 cm in diameter although it may be larger or smaller. The outer diameter of the screw vanes may be for example between 20 and 40 cm although it may be larger or smaller.

In this example the peripheral speed at the screw pipe surface, given a rotational speed of approximately 30 revolutions per minute, is approximately 15 cm per second, with the precise value being related to current conditions so it can be calculated.

In typical configurations and applications the advance rate of the slug is approximately 1 cm per second. Given a shaft passing through the entire slug and rotating inside the slug, then the relative speed between the slug and the worm shaft surface will be 1 cm per second in the longitudinal direction and approximately 15 cm per minute in the peripheral direction.

Now when according to the invention a separate pipe-like structure is employed which is for example mounted stationary, the relative peripheral speed will virtually be 0 such that the only speed factor remaining is the axial element of approximately 1 cm per second. Thus, the resulting differential speed between the slug and the surface of the pipe-like structure will only be approximately one 15th of the relative speed between this rotating worm shaft and a slug. Since abrasive matter tends to be contained in the slug, the service life of the worm shaft can thus be quite considerably increased.

In particularly preferred configurations, the pipe-like structure extends as far as the outlet and in particular through the outlet to the exterior. In this way, the slug structure will be supported throughout the entire housing such that the slug can maintain its structure as far as the outlet and beyond.

The pipe-like structure is preferably provided stationary. Or else it is conceivable for the pipe-like structure to be received rotatably at least in part or entirely.

The pipe-like structure preferably comprises at least one pipe or rod. It is conceivable to fasten the pipe-like structure at the housing. Or else it is conceivable to fasten the pipe-like structure to the screw in which case it is preferred to mount the pipe-like structure to be rotatable relative to the worm shaft.

It is for example possible for the pipe-like structure to protrude farther forwardly from the worm shaft so as to form a worm shaft extension. Such a worm shaft extension is readily replaceable as needed such that the worm shaft per se will have a longer life. In order to minimize wear on the worm shaft extension as well, it may be mounted rotatable relative to the worm shaft. Due to the friction between the slug and the worm shaft extension the worm shaft extension will as a rule not rotate along even if it is fastened to the worm shaft but remain roughly stationary. In this way, the peripheral speed between the slug and the worm shaft extension is virtually reduced to 0 such that only an axial differential speed will remain so as to extend the service life of the worm shaft extension.

In preferred configurations, at least one press basket is mounted downstream of the strainer basket. It is particularly preferred for the housing to comprise at least one filter housing with the strainer basket mounted thereto, and a press housing separate therefrom with the press basket mounted thereto. It is particularly preferred for the press housing to be configured as a front cover that can be swung away or pivoted and that is fastened to the filter housing in particular by a quick release or the like.

Preferably the front cover is mounted to be pivotal in particular in at least two positions by means of a flap mechanism or a hinge or the like. The two or three pivot axes may be mounted in parallel relative to one another. Axial displacement and pivoting of the front cover is allowed in this way.

Advantageously a ring that is in particular replaceable is mounted between the strainer basket and the press basket. The ring may in particular be configured as a wearing ring and it may consist of plastic at least in part and/or of a metal at least in part.

Although the wearing ring is preferably configured to be tight in the radial direction, it may as well contain small apertures or the like to allow liquids to escape to the exterior through the wearing ring.

It is particularly preferred for the press basket and the wearing ring to be mounted in the front cover so as to make the wearing ring immediately accessible as the front cover is swung away.

The front cover is in particular provided with the outlet that is configured in particular as a mouthpiece.

The outlet may be provided with at least one ejection controller which may comprise a flap cover mechanism that is biased in the closed position. The flap cover mechanism may comprise 2, 3, 4, or more flap cover sections distributed over the circumference, each preferably being biased in the closed position.

In all of the configurations the screw is preferably supported on the feeder side and is guided at its free end.

The screw is in particular configured with two or more screw flights.

In all of the configurations the strainer basket is preferably retained in the housing radially floating and the press basket is in particular retained radially fixed.

While the strainer basket and/or the press basket may be retained axially floating, it is preferred for the strainer basket to be retained axially floating and the press basket, axially fixed.

In all of the configurations it is preferred for the inner diameter of the press basket to be larger than the inner diameter of the strainer basket. The inner diameter of the strainer basket is in particular adapted to the outer diameter of the screw. A radial gap between the outer diameter of the screw vanes and the inner diameter of the strainer basket is in particular less than 2 and preferably less than 1 and particularly preferably less than or equal to 0.5 mm. The relative gap width is preferably less than 1% of the outer screw vane diameter and particularly preferably between approximately 0.05 and 0.3% of the outer screw vane diameter.

In all of the configurations an inspection hole may be provided which is fastened in particular by at least one quick release and may be closed for example with a transparent inspection glass.

An electric motor or a hydraulic motor may serve as the drive.

A vibrating device may additionally be provided to allow introducing vibrations in particular into the feeder region of the screw separator by means of the vibrating device such that their effect carries over as far as and into the inlet region of the strainer basket or even beyond. The vibrating device may be mounted external of the feeder region and the vibrations may be transferable to a vibrator located in the liquid via supporting ribs or similar mechanisms. A membrane may serve for sealing the interior. All the vibrating elements may be supported by springs or rubber buffers or the like and move correspondingly in the vertical and/or horizontal or radial direction.

BRIEF DESCRIPTION OF THE DRAWINGS

Other advantages and possibilities of application of the present invention can be taken from the exemplary embodiment which will be discussed below with reference to the accompanying figures.

These show in.

DETAILED DESCRIPTION

Figure 1:
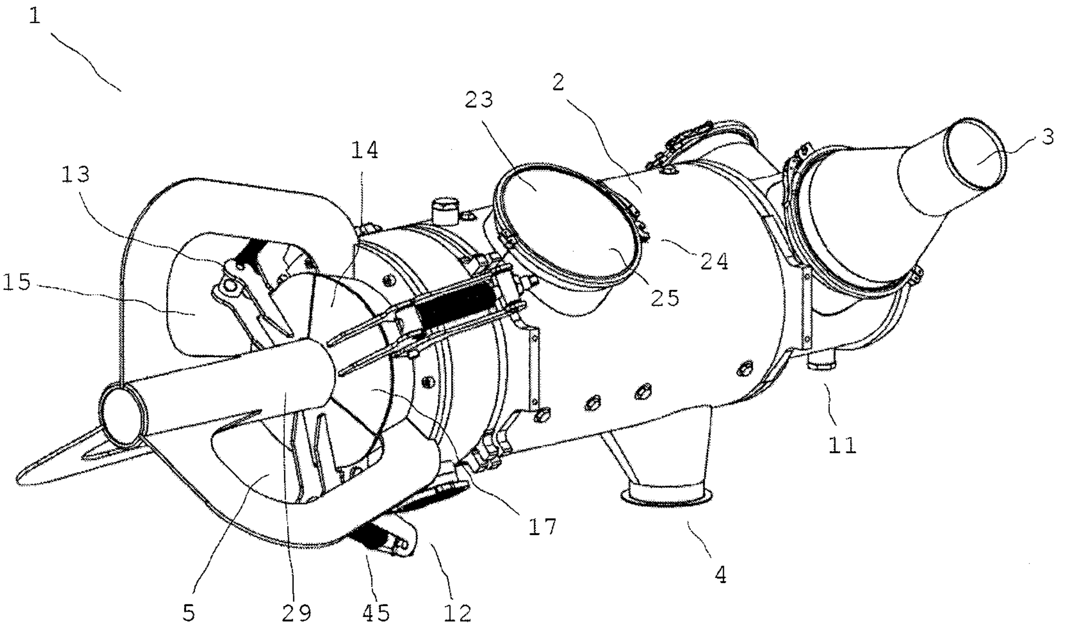
FIG. 1 a perspective view of an inventive screw separator in a closed position.

The screw separator 1 illustrated in FIG. 1 in a slightly perspective view in a closed state comprises a housing 2. The housing 2 is provided with a feed pipe 3 and with a discharge pipe 4 mounted in the lower region.

In the front region one can recognize the outlet 5 at the mouthpiece of the screw separator 1. The ejection controller 13 at the outlet 5 comprises a flap cover mechanism 14 configured as a spring flap cover mechanism comprising three cover sections 17 each being biased in the closed position 15 as illustrated in FIG. 1 by way of springs 45 such as disk springs or coil springs.

Unlike the illustrated embodiment the flap cover mechanism 14 may consist of four or five cover sections 17 each of which is separately biased in the closed position 15 by way of dedicated springs 45.

An inspection hole 23 provided with a cover that is for example configured as an inspection glass 25 and attached to the housing via a quick release 24 allows ready access to the interior of the screw separator 1. With the inspection hole 23 closed by an inspection glass 25, such inspection glass also permits inspecting the interior of the screw separator 1 during operation. In this way one can for example determine whether the filter screen of the strainer basket has clogged up with residue or the like.

In operation a suspension is filled into the feed pipe 3 to be separated by the screw separator 1 into liquid and solid constituents.

In operation a slug 35 will form (see FIG. 7) which is continuously moved towards the outlet 5 while new solid particles from the supplied suspension are continuously deposited at the rear end of the slug 35 thus forming a new slug.

Figure 2:
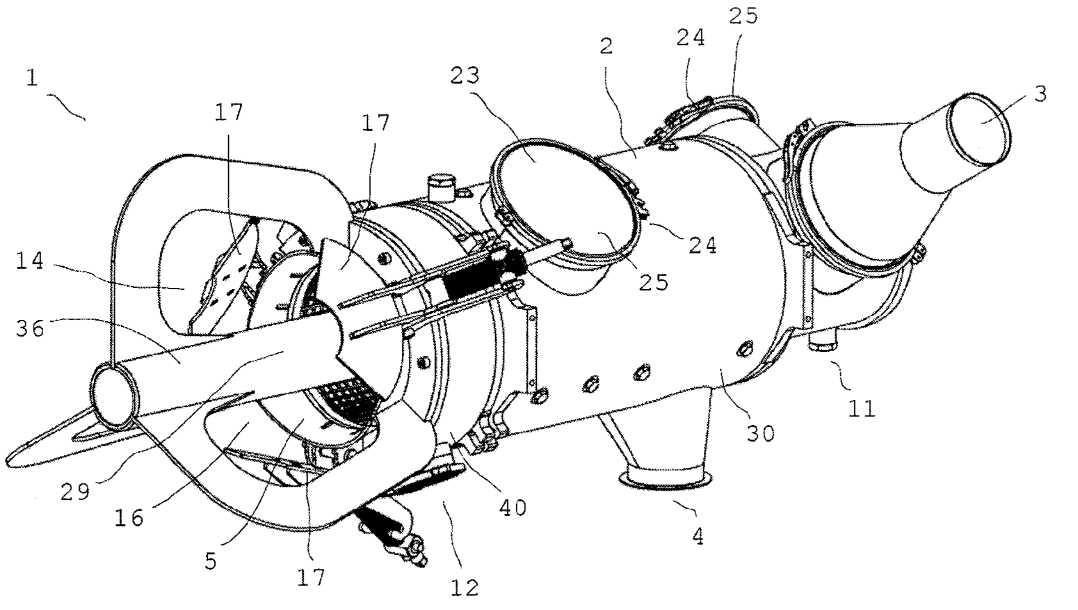
FIG. 2 the screw separator from FIG. 1 with the ejection controller in an open position.

In FIG. 2 the ejection controller 13 with the flap cover mechanism 14 is illustrated in an open position 16 in which for example the pressure from the slug 35 (not illustrated here) opens the cover sections 17 of the flap cover mechanism 14 against the spring force of the springs 45 such that the front part of the slug 35 is pushed out of the outlet.

Figure 3:
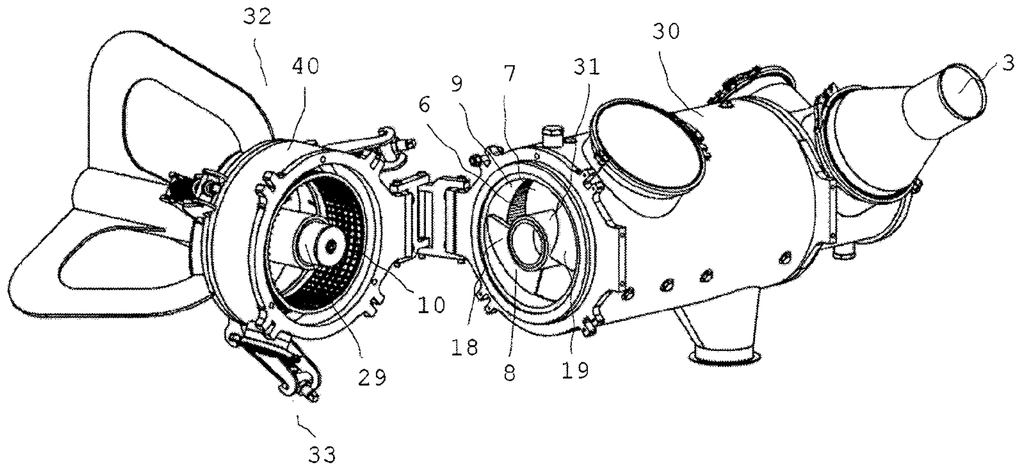
FIG. 3 the screw separator according to FIG. 1 with the front cover swung open.
Figure 4:
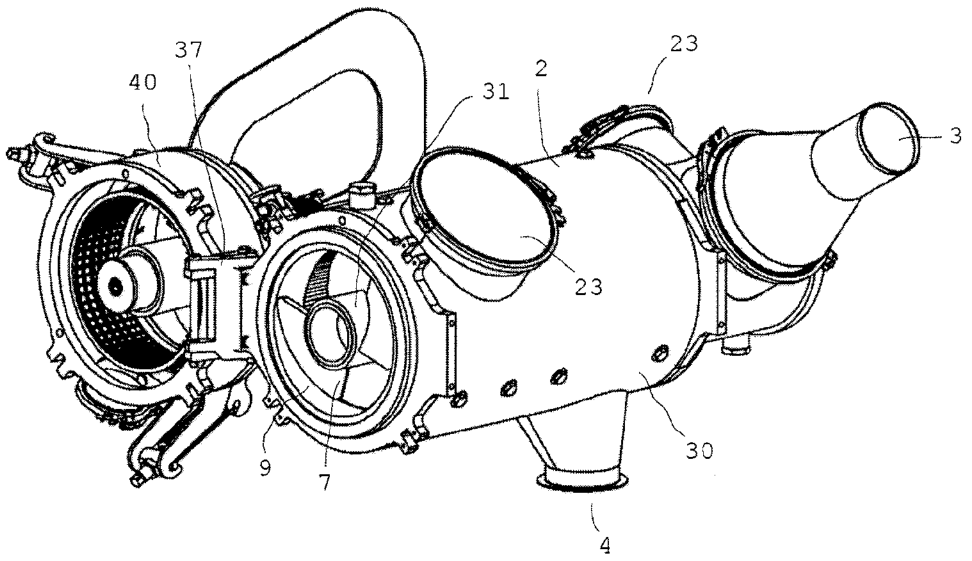
FIG. 4 the screw separator according to FIG. 1 with the front cover wide open.

In FIG. 3 the screw separator 1 is illustrated with the housing 2 partially opened and in FIG. 4, fully opened.

The housing 2 comprises the filter housing 30 and the press housing 40 which follows the filter housing 30 in the axial direction. It is clearly obvious that the two housing parts namely, the filter housing 30 and the press housing 40 which serves as the front cover 32, are interconnected via a hinge 37 which hinge 37 or swing mechanism comprises two or presently three pivoting axes parallel to one another such that the front cover 32 can be swung forwardly and then away to the side. The hinge 37 allows limited axial movement.

In the open position according to the FIGS. 3 and 4 the screw 7 is visible in the filter housing 30, being provided with screw vanes 8 in two screw flights 18 and 19 to thus provide a double-pitch screw 7.

In the axial direction the screw vanes 8 terminate in a separate ring or wearing ring 9 which is presently mounted at the front end of the filter housing 30 to be freely accessible. This enables ease of replacement for the wearing ring 9. Viewed from the feeder 3 towards the outlet 5, the strainer basket 6 lies in front of the wearing ring 9. The ring or wearing ring 9 may consist of plastic and/or fiber-reinforced materials, at least in part of a metal or a metal alloy, or else of wood and in particular hardwood.

In operation at least part of the liquid portion of the suspension emerges outwardly passing through the strainer basket that is configured as a filter screen and inside the filter housing 30 is diverted to the discharge 4.

The press housing 40 is fastened to the filter housing 30 by means of a quick release 33 or else several quick releases 33. For closing the housing 2 the front cover 32 is first swung towards the filter housing 30. In closing, the front tip of the pipe 29 or the pipe-like structure 36 enters the interior of the worm shaft 31 of the screw 7, thus guiding the worm shaft during operation.

The slug 35 forming in the filter housing 30 or slug 35 already having formed therein is presently hollow cylindrical in shape. The pipe 29 following the axial end of the worm shaft 31 stabilizes the interior of the slug 35. The fact that the outer diameter of the pipe 29 is matched to the outer diameter of the worm shaft 31 ensures ease of transition of the slug onto the pipe 29 in the press housing 40. The pipe 29 may likewise be configured slightly conically, tapering or widening in the axial direction.

In the press housing 40 the press basket 10 is provided through the filter surface of which the remaining squeezed-out liquid can emerge radially outwardly into the housing 2 before the slug 35 emerges outwardly through the front mouthpiece or the outlet 5. The separated solids can then be put to suitable use.

Figure 5:
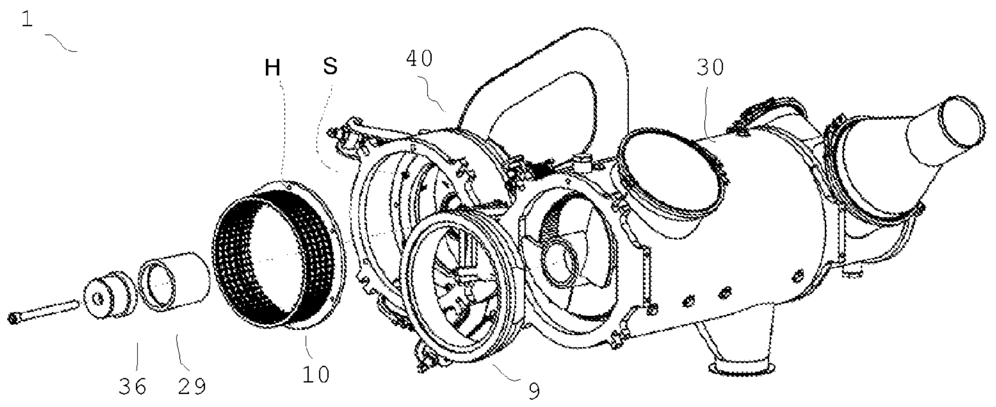
FIG. 5 the screw separator according to FIG. 1 with some of the components removed in an exploded view.

FIG. 5 shows a schematic exploded view of the screw separator 1 in an open position. One can clearly recognize the wearing ring 9 mounted axially in front of the filter housing 30. In front of the press housing 40 the press basket 10 and the pipe 29 or the pipe-like structure 36 is illustrated which serves as an axial extension of the worm shaft 31. The press basket 10 is axially fixed to the press housing 40 via fasteners such as screws S on the housing 40 which engage corresponding holes H on a radial flange of the press basket 10.

Figure 6:
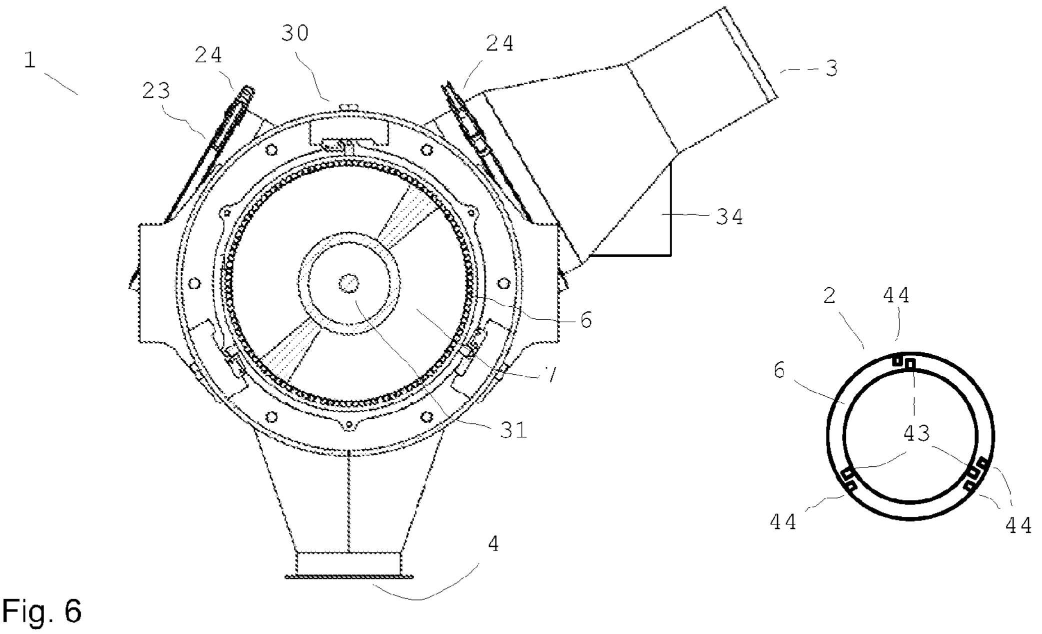
FIG. 6 a front view of the filter housing of the screw separator according to FIG. 1 and a schematic cross-section.

FIG. 6 shows a front view of the filter housing 30 allowing a look into the interior of the screw separator 1. The suspension supplied through the feed pipe 3 arrives in the feeder region 38 (see FIG. 8) and by means of the screw 7 is conveyed forwardly in the direction of the outlet 5.

The worm shaft 7 carries the screw vanes 8 and is guided tight in the strainer basket 6. The strainer basket 6 is configured as a filter screen, comprising rods arranged over the periphery in parallel in the longitudinal direction and spaced apart by gaps in the peripheral direction between about 1 and 2 mm. The exact gap size depends on the intended application and may be smaller or larger in relation to the materials to be separated.

Over the outer periphery of the strainer basket 6 three rods 43 are distributed symmetrically, being secured to the strainer basket 6 and providing a radially floating support of the strainer basket 6 and preventing the strainer basket 6 from rotating along with the screw 7. To this end, a total of four rods 44 are presently provided in the housing 2 serving as retaining means to prevent the strainer basket 6 from rotating along. The arrangement principle of the rods 43 and 44 is shown in the schematic cross-section on the right in FIG. 6. One rod 43 of the strainer basket is provided on both sides with rails or rods 44 in the filter housing while only one rod 44 each is provided in the housing for the other rods 43. Since the screw 7 will always only rotate in one direction it is sufficient to provide two rods in the filter housing 2 for one rod 43 only. The strainer basket 6 is radially movable in the housing 2 by about 2 mm such that the strainer basket can adjust to occurring stresses.

One or more inspection holes 23 may be provided in different places with transparent or non-transparent covers.

The feed pipe 3 or the feeder region 38 may be provided with a vibrating device 34 to intentionally introduce vibrations into the suspension or matter contained to achieve homogeneity of distribution and high efficiency of the screw separator 1.

Figure 7:
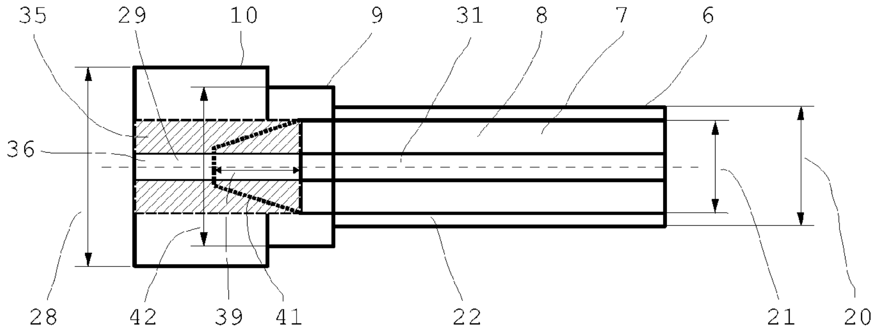
FIG. 7 a schematic longitudinal cross-section of another screw separator.

FIG. 7 shows a simplistic and in particular not true to scale cross-sectional view of a screw separator 1. The illustration in FIG. 7 shows in a highly magnified scale that the inner diameter 28 of the press basket is larger than the inner diameter 42 of the wearing ring 9 which in turn is larger than the inner diameter 20 of the strainer basket 6. The fact that each subsequent component is somewhat larger in its inner diameter than the preceding component ensures that the slug 35 passes unobstructed from one component to the next.

This construction in particular considerably increases the manufacturing tolerances for the press basket 10 so as to largely simplify manufacturing and reduce costs. The dimensions of the wearing ring 9 and of the press basket 10 ensure that their inner diameters are larger than is the inner diameter 20 of the strainer basket 6.

The pipe-like structure 36 or the pipe 29 inside the slug 35 stabilizes the slug, preventing it from collapsing. The pipe 29 is in particular configured stationary so as to quite considerably reduce wear on the pipe 29. In conventional screw separators in which the worm shaft 31 extends to the exterior through the mouthpiece beyond the press basket, the pipe continuously rotates with the slug 35 that virtually does not rotate along.

In a conventional screw separator 1 the relative speed between the outside of the worm shaft 31 and the slug 35, given a worm shaft diameter of approximately 10 cm and a rotational speed of approximately 30 revolutions/minute, is roughly estimated 15 cm/second. In this example the advance rate of the slug is approximately 1 cm/second. This means that the relative speed between the slug 35 and the worm shaft 31 is a combination of the advance rate of 1 cm/second and the relative rotational speed of approximately 5 cm/second. For the screw separator 1 the relative speed between the slug 35 and the pipe 29 in the press basket 10 is approximately 1 cm/second thus corresponding to the advance rate of the slug 35 since the pipe is mounted stationary. In the region of the press basket 10 the stresses are highest since this is where the highest pressures occur. By means of this measure, wear can be reduced quite considerably.

The additional dotted line denotes a cone section 41 of another configuration of a screw 7 where the screw vanes 8 are radially tapering over an axial section 39. Here the largest radial diameter lies in the region of the ring 9. The axial section 39 over which the screw vanes radially taper may extend as far as and into the press basket 10. Then the worm shaft 31 extends as far as the edges of the screw vanes 8. A suitable pipe 29 may be axially mounted at the rear of the worm shaft 31. In this configuration of the screw vanes 8, also shown in a dotted line, the region of maximum stress again lies within the wearing ring 9. This configuration allows for the screw vanes to formally extend as far as into the press basket 10 while the stresses within the press basket 10 are concurrently reduced so as to increase durability. A stepped tapering is in particular conceivable.

The radial gap 22 between the outer diameter 21 of the screw vanes 8 and the inner diameter 20 of the strainer basket is intentionally small, for example 0.5 mm, while the outer diameter of the screw vanes may be 20 cm, 25 cm, or even 30 cm. This very narrow gap prevents water or the suspension from spurting forwardly which would interfere with slug formation. Furthermore the screw vanes 8 continuously free the strainer basket 6 interior from residues, thus preventing clogging up.

Figure 8:
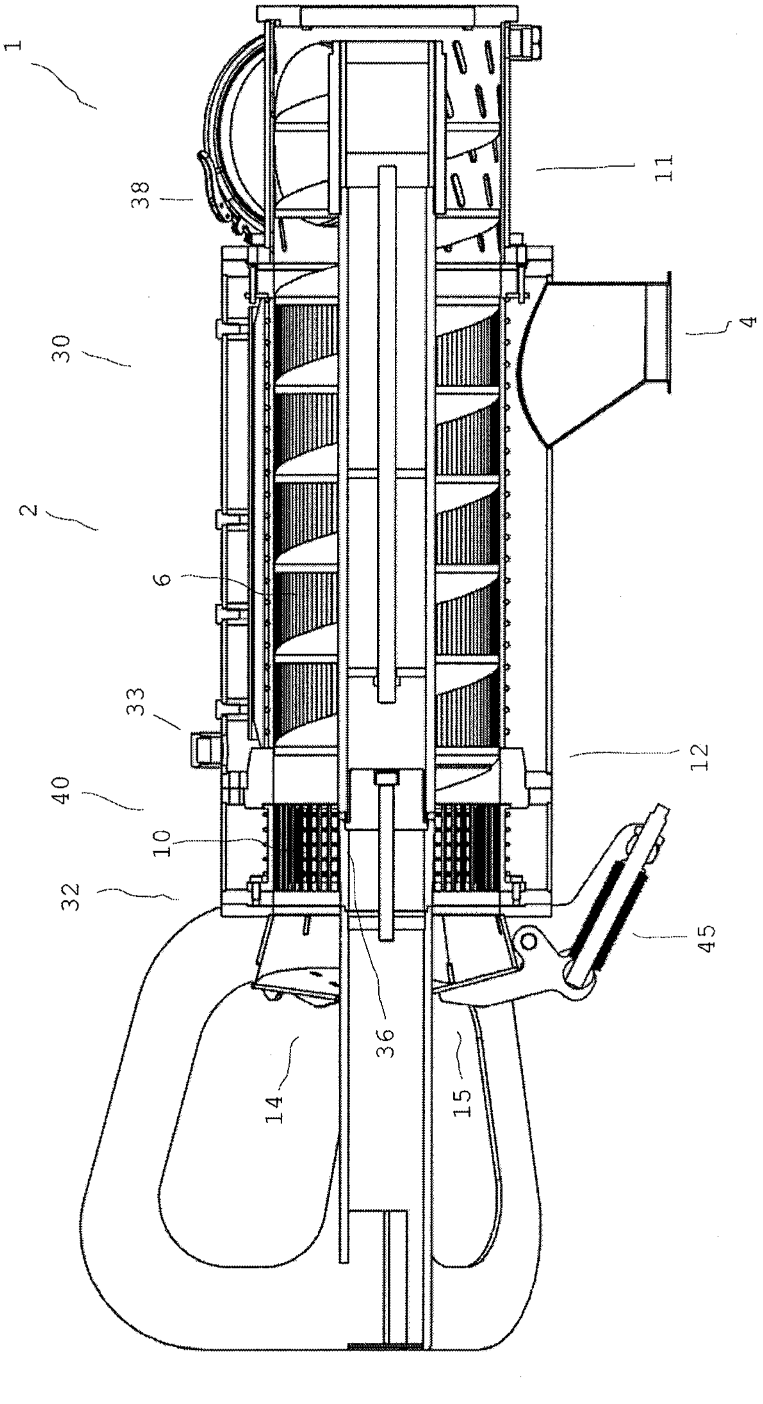
FIG. 8 a cross-section of the screw separator according to FIG. 1.

FIG. 8 shows a longitudinal cross-section of the screw separator 1. The suspension to be separated is fed to the feeder region 38 from where it is conveyed towards the strainer basket 6 by means of the screw vanes 8.

In the axially and radially floating strainer basket 6 the suspension charge is continuously compacted to thus form a slug 35 from the solids contained while the aqueous constituents run outwardly through the strainer basket 6 at least in part, draining off through the discharge 4. The screw vanes 8 terminate in the axial direction in a wearing ring 9 that is provided as a replaceable part.

The screw 7 is rotatably supported on the feeder side 11 and at its free end 12 it is guided by the pipe-like structure 36. It is as well conceivable to support the screw 7 at both ends.

The housing 2 consists of the filter housing 30 and the press housing 40 which is provided as a front cover 32 that can be swung away.

The front cover 32 is provided with a flap cover mechanism 14, presently having three cover sections 17 that are biased in the closed position via springs 45.

A pipe-like structure 36 is also retained in the front cover 32 configured as a hollow or else a solid pipe 29 which when closed axially follows the end of the worm shaft 31 which it guides.

On the whole the invention provides a screw separator which ensures high functional reliability, high durability, and reliable operation while also offering ease of maintenance.

Due to a separate ring 9 being provided between the strainer basket 6 which serves as a dewatering screen and the press basket 10 in which the effective portion of the screw vanes 8 terminates, the strainer basket 6 is subjected to reduced wear so as to achieve increased durability. This is again supported by the fact that the strainer basket 6 is received in the housing 2 to be radially floating while the press basket 10 is axially and radially fixed in the housing 2.

Another considerable advantage is the separate construction of the pipe 29 which axially follows the worm shaft 31 that terminates inside the housing 2. For one the pipe 29 ensures that the slug 35 retains stability inside the press basket 10 and for another the pipe 29 received in particular stationary considerably reduces wear on the worm shaft 31.

On the whole a screw separator 1 offering flexible applications is provided which achieves high durability at low operational costs.

While a particular embodiment of the present screw separator has been described herein, it will be appreciated by those skilled in the art that changes and modifications may be made thereto without departing from the invention in its broader aspects and as set forth in the following claims.

The invention claimed is:

1. A screw separator for separating solids out of a suspension, the screw separator, comprising:
- at least one housing and at least one feed pipe for the suspension, said at least one housing including at least one filter housing and a press housing hingedly mounted to said at least one filter housing;
- at least one discharge pipe for liquids;
- at least one outlet for at least partially dewatered solids;
- wherein at least one strainer basket is provided in the at least one filter housing in which a screw is rotatably mounted, said screw including a worm shaft;
- wherein the worm shaft of the screw terminates inside the at least one filter housing and is continued by way of a separate pipe-like structure on an end of a pipe on the press housing, and
- wherein an outer diameter of the pipe is matched to an outer diameter of the worm shaft.

2. The screw separator according to claim 1, wherein the separate pipe-like structure extends as far as the outlet or through the outlet to an exterior of the at least one housing.

3. The screw separator according to claim 1, wherein the separate pipe-like structure is received at least partially rotatable.

4. The screw separator according to claim 1, wherein the separate pipe-like structure is configured at least partially solid.

5. The screw separator according to claim 1, wherein the separate pipe-like structure is configured at least partially conically.

6. The screw separator according to claim 1, wherein the separate pipe-like structure comprises at least one pipe.

7. The screw separator according to claim 1, wherein the separate pipe-like structure is fastened to the screw and is mounted rotatable relative to the worm shaft.

8. The screw separator according to claim 1, wherein at least one press basket is mounted downstream of the at least one strainer basket.

9. The screw separator according to claim 8, wherein the at least one strainer basket is mounted to the at least one filter housing, and the at least one press basket is mounted to the press housing.

10. The screw separator according to claim 9, wherein the press housing is configured as a front cover which can be swung or pivoted away.

11. The screw separator according to claim 8, wherein a replaceable wearing ring is mounted between the at least one strainer basket and the at least one press basket.

12. The screw separator according to claim 11, wherein the replaceable wearing ring is configured to be tight in the radial direction.

13. The screw separator according to claim 8, wherein the at least one press basket and a wearing ring are mounted in a front cover.

14. The screw separator according to claim 10, wherein the front cover is provided with the outlet.

15. The screw separator according to claim 1, wherein at least one ejection controller is provided at the outlet.

16. The screw separator according to claim 1, wherein a flap cover mechanism comprises at least three or four flap cover sections.

17. The screw separator according to claim 1, wherein the at least one strainer basket is retained floating and at least one press basket is retained axially fixed.

18. The screw separator according to claim 8, wherein the at least one strainer basket is retained axially floating and the at least one press basket, axially fixed.

19. The screw separator according to claim 8, wherein an inner diameter of the at least one press basket is larger than an inner diameter of the at least one strainer basket.

20. The screw separator according to claim 1, wherein at least one transparent inspection glass is provided at the at least one housing.

21. The screw separator according to claim 1, wherein at least one vibration device is provided, and vibrations can be introduced into a feeder region by means of the at least one vibrating device such that their effect carries over as far as and into an inlet region of the at least one strainer basket.

22. The screw separator according to claim 21, wherein the vibrating device is mounted external of the feeder region and in particular the at least one vibrations of the vibrating device are transferable via supporting ribs to a vibrator located in the supspension; and wherein a membrane ensures that an interior is sealed and all the vibrating elements are supported by springs or rubber buffers, allowing movement at least in a vertical direction.

23. A screw separator for separating solids out of a suspension, the screw separator comprising:

at least one housing and at least one feed pipe for the suspension, said at least one housing including at least one filter housing and a press housing hingedly mounted to said at least one filter housing;

at least one discharge pipe for liquids;

at least one outlet for the at least partially dewatered solids;

wherein at least one strainer basket is provided in the at least one filter housing in which a screw is rotatably mounted;

a worm shaft of the screw terminates inside the at least one filter housing and is continued by way of a separate pipe-like structure in said press housing; and the separate pipe-like structure is rotatable relative to the worm shaft.

* * * * *